United States Patent [19]

Fuchida

[11] Patent Number: 5,718,446
[45] Date of Patent: Feb. 17, 1998

[54] VEHICLE SUSPENSION SYSTEM

[75] Inventor: Takeshi Fuchida, Isehara, Japan

[73] Assignee: Unisia Jecs Corporation, Atsugi, Japan

[21] Appl. No.: 619,523

[22] PCT Filed: Sep. 14, 1995

[86] PCT No.: PCT/JP95/01837

§ 371 Date: Apr. 30, 1996

§ 102(e) Date: Apr. 30, 1996

[87] PCT Pub. No.: WO96/08385

PCT Pub. Date: Mar. 21, 1996

[30] Foreign Application Priority Data

Sep. 14, 1994 [JP] Japan ................... 6-220309

[51] Int. Cl.$^6$ ................................................ B60G 21/00
[52] U.S. Cl. ........................................ 280/703; 280/707
[58] Field of Search ................................. 280/703, 707

[56] References Cited

U.S. PATENT DOCUMENTS

| | | | |
|---|---|---|---|
| 4,831,532 | 5/1989 | Kondo | 364/426.02 |
| 5,208,749 | 5/1993 | Adachi et al. | 280/707 |
| 5,338,058 | 8/1994 | Ohtagaki et al. | 280/707 |

FOREIGN PATENT DOCUMENTS

| | | |
|---|---|---|
| 0 135 902 | 4/1985 | European Pat. Off. . |
| 0 545 687 | 6/1993 | European Pat. Off. . |
| 37 08 581 | 10/1987 | Germany . |
| 43 11 306 | 10/1993 | Germany . |
| 62-253507 | 11/1987 | Japan . |
| 4-325304 | 11/1992 | Japan . |
| 5-615 | 1/1993 | Japan . |
| 6-293207 | 10/1994 | Japan . |
| 2 211 154 | 10/1988 | United Kingdom . |

OTHER PUBLICATIONS

Patent Abstracts of Japan, vol. 11, No. 255, Pub. No. JP62061810, Aug. (1987).
Patent Abstracts of Japan, vol. 11, No. 238, Pub. No. JP62050213, Aug. (1987).

Primary Examiner—Kenneth R. Rice
Attorney, Agent, or Firm—Foley & Lardner

[57] ABSTRACT

A vehicle suspension system provided between a vehicle body and each of road wheels. The vehicle suspension system includes damping force varying means (a) for switching extension and compression side damping force characteristics in a plurality of steps. The damping force varying means is operable to provide a 0.1 or less damping coefficient ratio of the compression side damping force with respect to the compression side damping force. The vehicle suspension system comprises a shock absorber (b) for damping vibrations transmitted from the road wheel by movement of a fluid enclosed therein, vehicle behavior detecting means (c) for detecting a vehicle behavior, damping force characteristic control means (e) having ordinary control means (d) for controlling the damping force characteristic of the shock absorber based on a vehicle behavior indicative signal produced from the vehicle behavior detecting means (c), braking application detecting means (f) for detecting the application of braking to the vehicle, correcting means (g) provided in the damping force characteristic control means for switching the damping force characteristic varying means of the shock absorber to provide a 1.0 or less damping coefficient ratio of the extension side damping force with respect to the compression side damping force when the braking application detecting means detects the application of braking to the vehicle. The contact load variations resulting from a vehicle behavior produced in the presence of vehicle braking are suppressed to ensure sufficient braking force.

8 Claims, 19 Drawing Sheets (a) DAMPING COEFFICIENT RATIO (TEN/COM) = 4.1

(b) DAMPING COEFFICIENT RATIO (TEN/COM) = 1.5

(c) DAMPING COEFFICIENT RATIO (TEN/COM) = 0.8

LOAD VIBRATION CENTER INCREASING DIRECTION

VEHICLE SUSPENSION SYSTEM

FIELD OF THE INVENTION

This invention relates to a suspension system including a spring and a shock absorber provided between a vehicle body and a vehicle road wheel and, more particularly, to a vehicle suspension system adapted to control the shock absorber to have an optimum damping force characteristic in the presence of vehicle braking.

BACKGROUND OF THE INVENTION

In general, vehicle suspension systems include a plurality of links, a spring for absorbing vibrations transmitted from the road surface to the vehicle body, and a shock absorber for damping the vibrations. Some conventional shock absorbers are of the variable damping force characteristic type having a damping force characteristic controllable according to vehicle operating conditions that are sensed during vehicle operation. For example, Japanese Patent Kokai NO. 4-103420 discloses a vehicle suspension system adapted to control the damping force characteristic of a shock absorber.

In the vehicle suspension system disclosed in the Japanese Patent Kokai, the time rate of change (actual rate of change) of the damping force actually obtained by the shock absorber is calculated. The calculated time rate of change of the damping force is compared with a reference time rate. Normally, a hard damping characteristic is selected to ensure good driving stability. In order to provide a good driving feel to the passenger during vehicle driving on a bad road, the shock absorber damping force characteristic is switched from the hard characteristic to a soft characteristic when the calculated time rate of change of the damping force exceeds the reference time rate. The reference time rate is set at a greater value in the presence of vehicle braking than in the absence of vehicle braking. The reference time rate is increased in response to the operation of an antiskid braking system, that is, in response to the application of urgent braking to the vehicle. This is effective to suppress the vehicle posture changes according to the degree of the vehicle braking.

Although such a conventional system can suppress vehicle posture changes by retaining the shock absorber to have a hard damping force characteristic during the application of braking to the vehicle, the hard damping force characteristic is provided during both of the extension and compression strokes of the shock absorber. For this reason, the following difficulties are associated with the conventional system.

If the shock absorber has a hard damping force characteristic during the application of braking to the vehicle, the contact load (the force under which the tire contacts the road surface) will increase to increase the braking force during its compression stroke, whereas the contact load will decrease to decrease the braking force during its extension stroke. For this reason, the braking distance will increase particularly when the vehicle is running on a bad road causing shock absorber movements. This tendency will be enhanced since the shock absorber is set to have a greater damping force during its extension stroke than during its compression stroke with regard to the direction in which the weight of the vehicle body acts.

FIG. 18 shows variations in the contact load. The dotted curve relates to the contact load variations measured when the ratio TEN/COM (damping coefficient ratio) of the damping force (TEN) provided during its extension stroke with respect to the damping force (COM) provided during its compression stroke is greater than 1.0. The solid curve relates to the contact load variations measured when the damping coefficient ratio is equal to or less than 1.0. As can be seen from FIG. 18, the contact load is smaller in the former case than in the latter case when the vehicle is running on a bad road causing a high frequency road surface input.

FIGS. 19(a), 19(b) and 19(c) show contact loads variations with respect to respective load variation centers at damping coefficient ratios (TEN/COM) of 4.0, 1.5 and 0.8. It can be seen from these figures that the deviation of the load variation center in the load decreasing direction increases as the damping coefficient ratio increases.

In view of the above considerations, the invention has for its object to provide a vehicle suspension system which can ensure sufficient braking force by suppressing contact load reductions resulting from vehicle behaviors produced in the presence of vehicle braking.

DISCLOSURE OF THE INVENTION

According to the invention, the above object can be achieved by a vehicle suspension system as shown in the block diagram of FIG. 1. The vehicle suspension system is provided between a vehicle body and each of road wheels and it includes damping force varying means (a) for switching extension and compression side damping force characteristics in a plurality of steps, the damping force varying means being operable to provide a 0.1 or less damping coefficient ratio of the compression side damping force with respect to the compression side damping force, a shock absorber (b) for damping vibrations transmit ted from the road wheel by movement of a fluid enclosed therein, vehicle behavior detecting means (c) for detecting a vehicle behavior, damping force characteristic control means (e) having ordinary control means for controlling the damping force characteristic of the shock absorber (b) based on a vehicle behavior indicative signal produced from the vehicle behavior detecting means (c), braking application detecting means (f) for detecting the application of braking to the vehicle, correcting means (g) provided in the damping force characteristic control means (e) for switching the damping force characteristic varying means (a) of the shock absorber (b) to provide a 1.0 or less damping coefficient ratio of the extension side damping force with respect to the compression side damping force when the braking application detecting means (f) detects the application of braking to the vehicle.

In the vehicle suspension system of the invention, as described above, the correcting means (g) switches the damping force characteristic varying means (a) of the shock absorber (b) to a position where the damping coefficient ratio of the extension side damping force to the compression side damping force is equal to or less than 1.0 in the presence of vehicle braking.

That is, when the vehicle is running on a bad road causing movement of the shock absorber (b), the tire contact load increases at a greater compression side damping force provided during the compression stroke of the shock absorber (b) and the tire contact load increases at a smaller extension side damping force provided during the extension stroke of the shock absorber. It is, therefore, possible to prevent contact load reductions resulting from vehicle behaviors so as to ensure good braking force by setting 1.0 or greater damping coefficient ratio of the extension side damping force with respect to the compression side damping force (that is, the extension side damping force is smaller than the compression side damping force).

It is possible to suppress contact load reductions resulting from vehicle behaviors produced in the presence of vehicle braking when the vehicle is running on a bad road causing shock absorber movement. This is effective to ensure good braking force.

In the invention as claimed in claim 2, the vehicle suspension system includes pitch rate detecting means (h) for detecting a vehicle pitch rate. The function of the correcting means (g) is stopped when the pitch rate detected by the pitch rate detecting means (h) exceeds a predetermined threshold value.

With the vehicle suspension system arranged in this form, the operation of the correcting means (g) is stopped even upon the application of braking to the vehicle as long as the vehicle pitch rate detected by the pitch rate detecting means (h) exceeds a predetermined threshold valve. It is, therefore, possible to suppress vehicle pitching motions by the operation of the control means (d).

PREFERRED EMBODIMENTS OF THE INVENTION

Preferred embodiment of the invention will be described with reference to the accompanying drawings.

Figure 1:
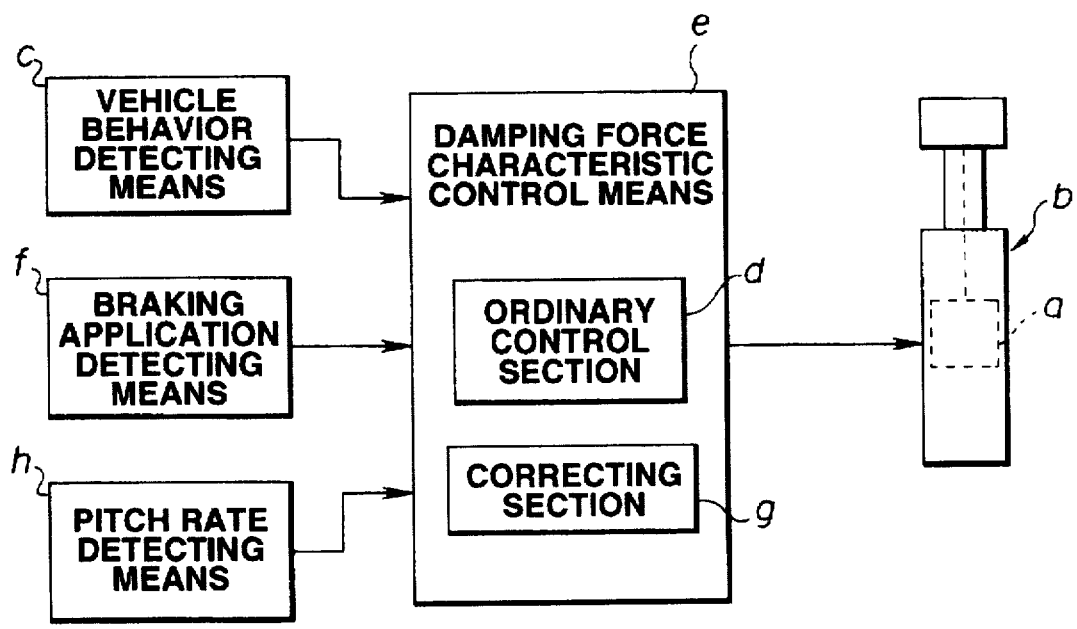
FIG. 1 is a schematic block diagram showing a vehicle suspension system made in accordance with the invention.
Figure 2:
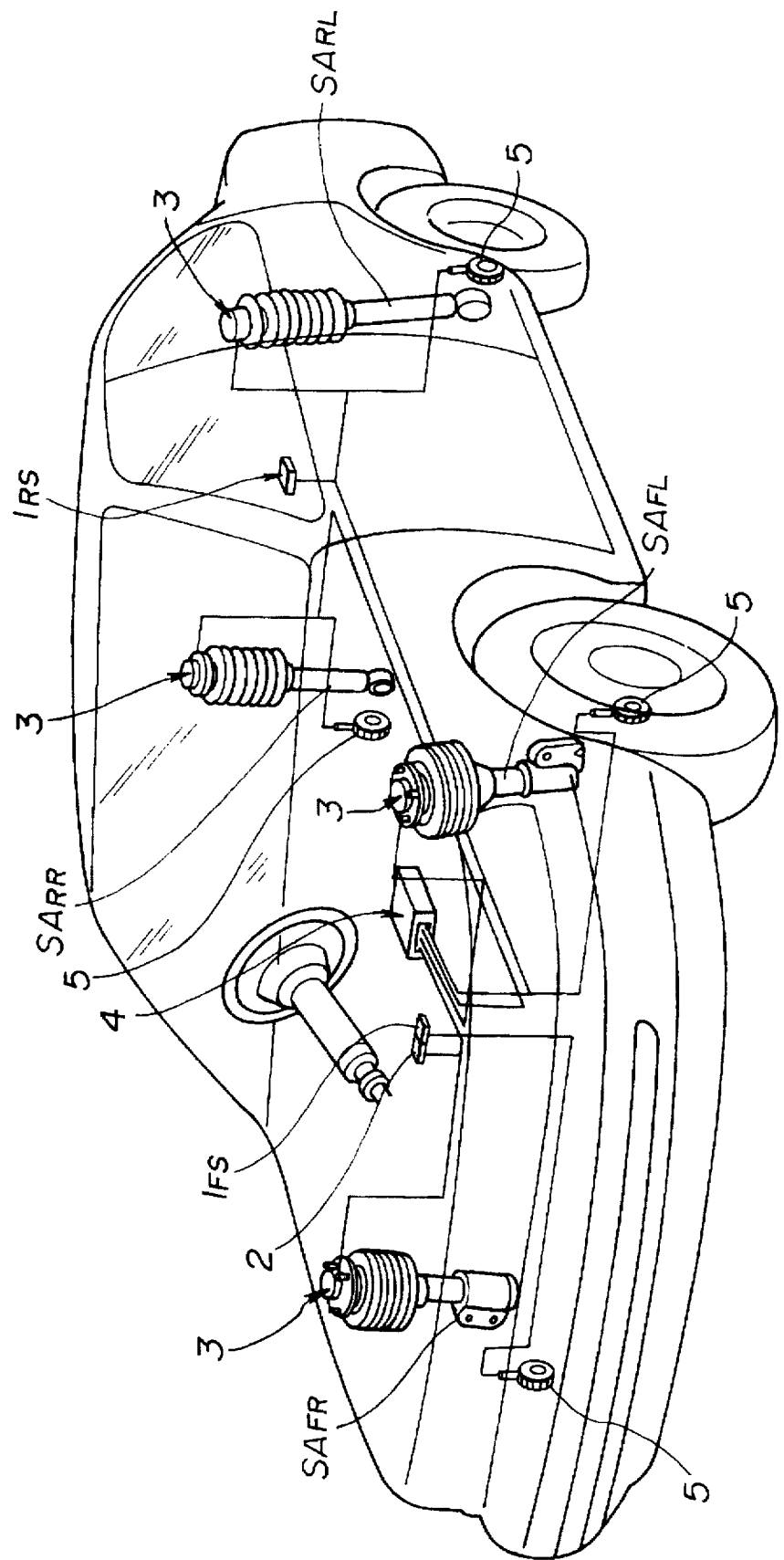
FIG. 2 is a schematic diagram showing a first embodiment of the vehicle suspension system of the invention.

First of all, description will be made to a first embodiment of the vehicle suspension system of the invention. FIG. 2 is a schematic diagram of the first embodiment of the suspension system of the invention applied to an automotive vehicle. In this embodiment, the suspension system is of the strut type including a spring and a shock absorber SA provided between a vehicle body and each of road wheels. Shock absorbers $SA_{FL}$, $SA_{FR}$, $SA_{RL}$ and $SA_{RR}$ (the character SA is used throughout the invention to designate each of these four shock absorbers) are provided for the respective road wheels. Front and rear vertical acceleration sensors (referred hereinafter to as vertical G sensors) $1_{FS}$ and $1_{RS}$ are provided on the vehicle body at the position intermediate the front-left and -right road wheels $SA_{FL}$ and $SA_{FR}$ and at the position intermediate the rear-left and -right road wheels $SA_{RL}$ and $SA_{RL}$ for detecting the vertical accelerations at the respective intermediate positions. A longitudinal acceleration sensor (referred hereinafter to as longitudinal G sensor) 2 is provided on the vehicle body at a position intermediate the front-left and -right shock absorbers $SA_{FL}$ and $SA_{FR}$ for detecting the longitudinal vehicle acceleration (or deceleration). This longitudinal G sensor acts as a braking application detecting means for detecting the application of braking to the vehicle. A road wheel speed sensor 5 is provided for detecting the speed of rotation of each of the road wheels. A vehicle speed sensor 6 (not shown in FIG. 2) is provided on the vehicle body for detecting the vehicle speed. A brake switch BS (not shown in FIG. 2) is provided for detecting the application of braking to the vehicle (that is, the operator's depression of the brake pedal). The brake switch constitutes a braking application detecting means. A control unit 4, which is provided near the driver's seat, receives signals fed thereto from the vertical G sensors $1_{FS}$ and $1_{RS}$, the longitudinal G sensor 2, the road wheel speed sensors 5, the vehicle speed sensor 6 and the brake switch BS, and it produces a drive control signal to a pulse motor 3 provided for each of the respective shock absorbers SA.

Figure 3:
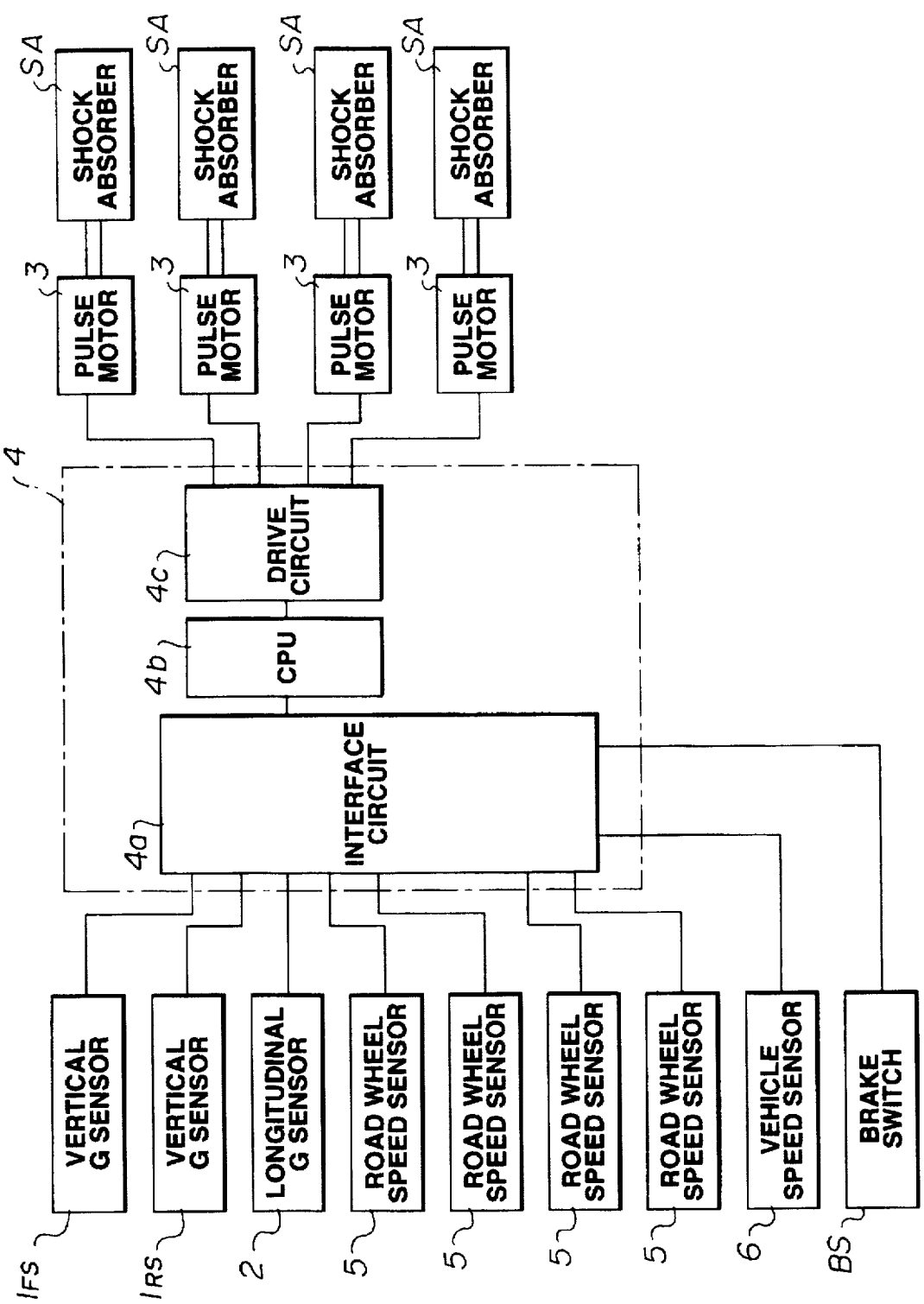
FIG. 3 is a block diagram showing a control unit used in the first embodiment of the vehicle suspension system of the invention.

As shown in the system block diagram of FIG. 3, the control unit 4 includes an interface circuit 4a, a CPU 4b and a drive circuit 4c. The interface circuit 4a receives signals fed thereto from the vertical G sensors $1_{FS}$ and $1_{RS}$, the longitudinal G sensor 2, the road wheel speed sensors 5, the vehicle speed sensor 6 and the brake switch BS.

Figure 14A:
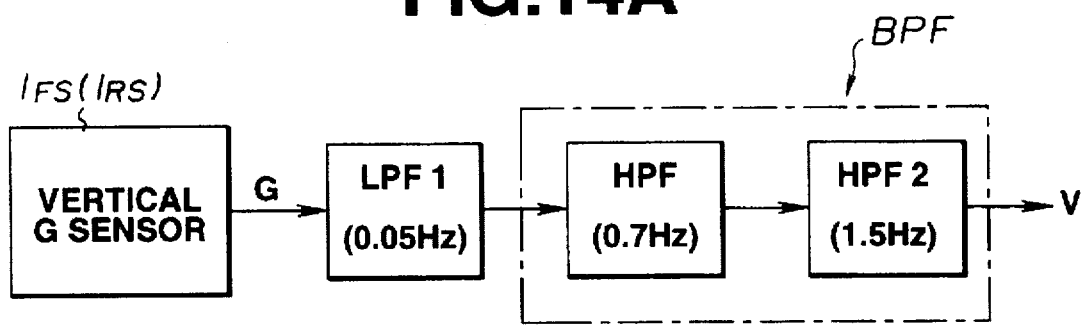
FIG. 14 contains block diagrams showing a part of the signal processing unit used in the first embodiment of the vehicle suspension system of the invention.
Figure 14B:
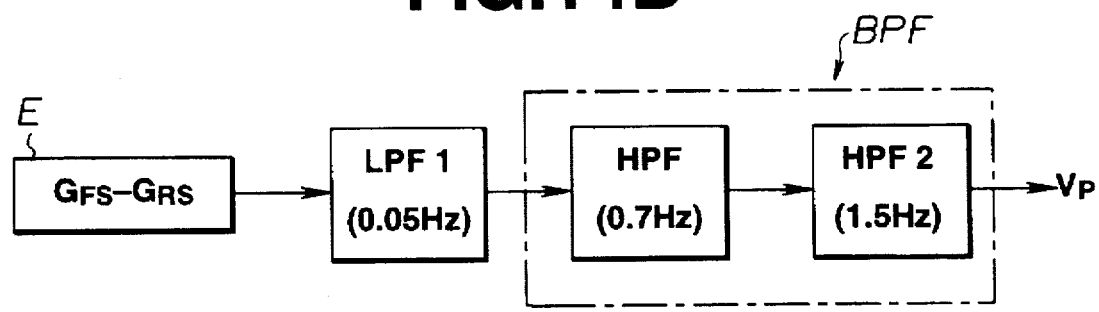
Figure 14C:
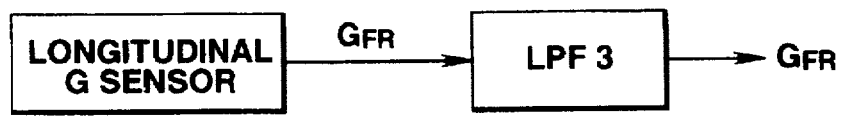

The interface circuit 4a includes three kinds of signal processing circuits shown in FIGS. 14(a), 14(b) and 14(c).

That is, the signal processing circuit as shown in FIG. 14(a) is provided for each of the front and left vertical G sensors $1_{FS}$ and $1_{RS}$ for producing a control signal V. This signal processing circuit includes a low pass filter LPF1 having a cutoff frequency of 0.05 Hz to convert the corresponding one of the sprung mass acceleration signals G fed thereto from the vertical G sensors 1 into a sprung mass vertical speed by integrating the sprung mass acceleration signal G. The signal processing unit also includes a band pass filter BPF comprised of a high pass filter HPF and a low pass filter LPF2 for noise removal and phase correction. The high pass filter has a cutoff frequency of 0.7 Hz and the low pass filter has a cutoff frequency of 1.5 Hz.

The signal processing circuit as shown in FIG. 14(b) is provided for obtaining the vehicle pitch rate $V_P$. This signal processing circuit includes a calculation circuit E for calculating a relative acceleration difference of the rear road wheel side vertical acceleration $G_{RS}$ sensed at the position intermediate the rear road wheels by the rear road wheel side vertical G sensor $1_{RS}$ from the front road wheel side vertical acceleration $G_{FS}$ sensed at the position intermediate the front road wheels by the front road wheel side vertical G sensor $1_{FS}$. The signal processing circuit also includes a low pass filter LPF1, a high pass filter HPF and a low pass filter LPF2 which are substantially the same of the filters used in the signal processing circuit of FIG. 14(a). That is, these filters are arranged for converting the relative acceleration difference to a corresponding vehicle pitch rate $V_P$.

The signal processing circuit as shown in FIG. 14(c) is provided for converting the vehicle longitudinal acceleration $G_{FR}$ to a corresponding vehicle deceleration $G_{FR}'$ for use in determining the application of braking to the vehicle. This signal processing circuit includes a low pass filter LPF3 for removing noise and extracting the Dc component.

The control unit 4 also includes an antiskid control device (ABS device) for preventing the road wheels from being locked in the presence of vehicle braking based on the signals fed thereto from the road wheel speed sensors 5 and the vehicle speed sensor 6, and an ABS operation detecting means for detecting the operation of the antiskid control device.

Figure 4:
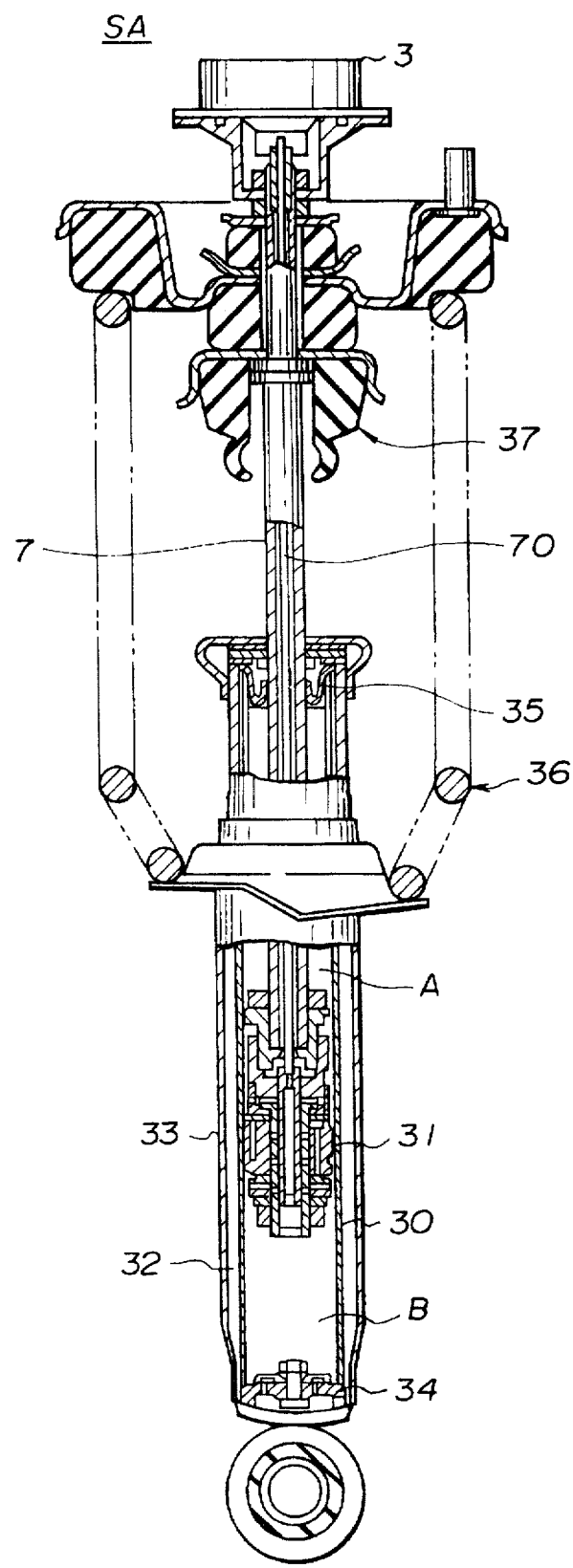
FIG. 4 is a sectional view showing a shock absorber used in the first embodiment of the vehicle suspension system of the invention.

FIG. 4 is a sectional view showing the strut arrangement including the shock absorber SA. The shock absorber SA includes a cylinder 30, a piston 31 positioned to divide the cylinder 30 into upper and lower chambers A and B, an outer envelope 33 positioned to define a reservoir 32 along with the outer periphery of the cylinder 30, a base 34 provided to divide the lower chamber B from the reservoir 32, and a guide member 35 provided to guide the sliding movement of a piston rod 7 coupled to the piston 31.

Figure 5:
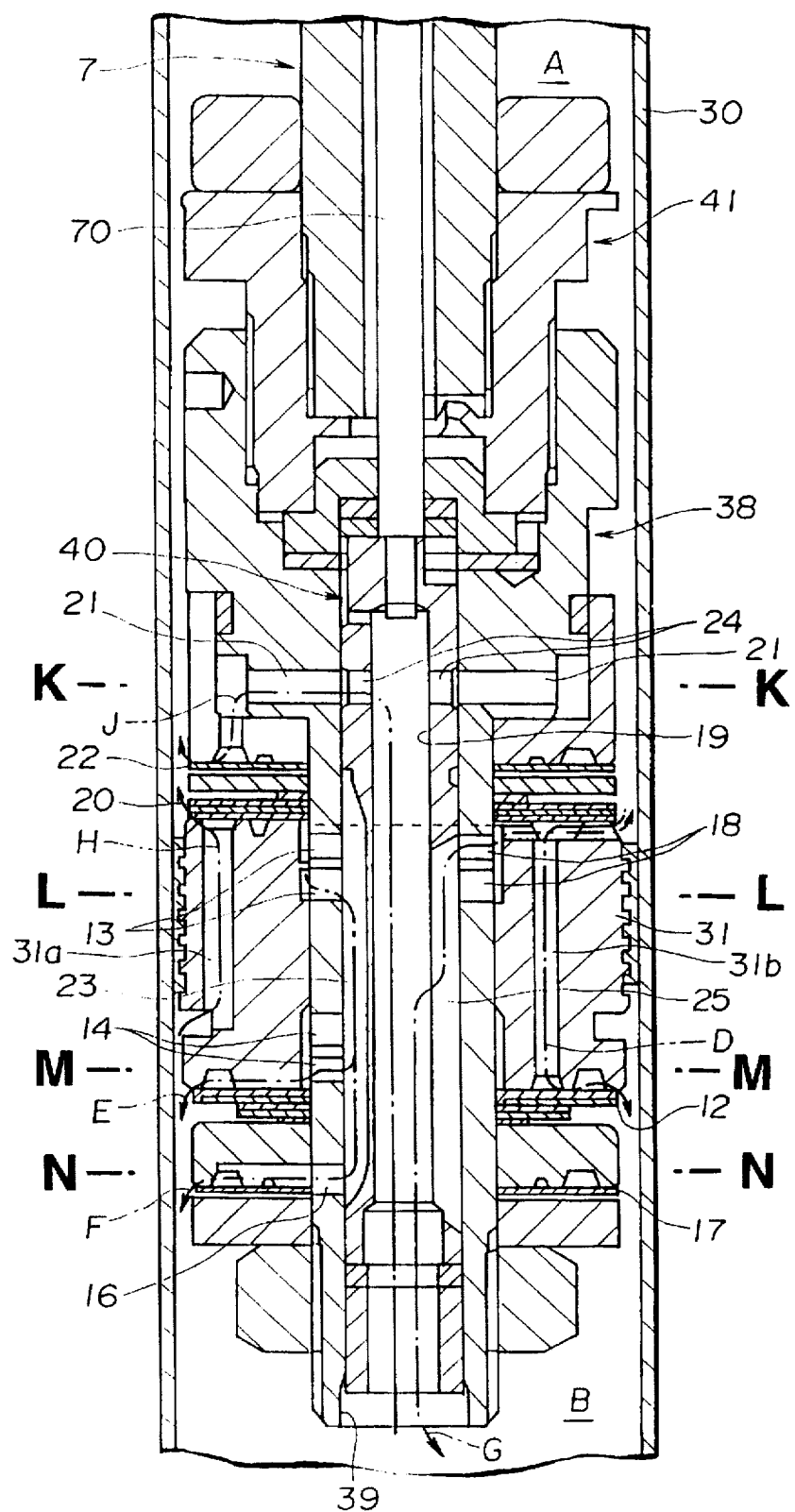
FIG. 5 is an enlarged sectional view showing a significant portion of the shock absorber.

FIG. 5 is an enlarged sectional view showing the piston 31. The piston 31 is formed with bores 31a and 31b. A compression side damping valve 20 is provided in cooperation with the bore 31a, and an extension side damping valve 12 is provided in cooperation with the bore 31b. A stud 38, which extends through the piston 31, is fixed to a bound stopper 41 threadedly engaged on the tip end of the piston rod 7. The stud 38 has a communication bore 39 which forms a flow passage bypassing the bores 31a and 31b to connect the upper and lower chambers A and B. (This flow passage includes an extension side second flow passage E, an extension side third flow passage F, a bypass flow passage g and a compression side second flow passage J, as will be described in greater detail.) An adjuster 40 is provided for rotation within the communication bore 39 to vary the effective cross section of the flow passage. The stud 38 is provided on its outer periphery with extension and compression side check valves 17 and 22 to permit flow through the flow passage including the communication bore 39 only in a predetermined direction but inhibit flow through the flow passage in the opposite direction. The rotation of the adjuster 40 is made through a control rod 70 by a corresponding one of the pulse motors 3 (see FIG. 4). The stud 38 has a first port 21, a second port 13, a third port 18, a fourth port 14 and a fifth port 25 formed therein in this order from above to below in the drawing.

The adjuster 40 has a hollow portion 19 and first and second lateral holes 24 and 25 to make a connection between the interior and exterior. The adjuster is formed in its outer periphery with a longitudinal groove 23 extending axially thereof.

Thus, four flow passages are formed for fluid communication between the upper and lower chambers A and B during an extension stroke. These flow passages includes an extension side first flow passage D leading through the bore 31b and the extension side damping valve 12 to the lower chamber B, an extension side second flow passage E leading through the second port 19, the longitudinal groove 23, the fourth port 14 and the extension side damping valve 12 to the lower chamber B, an extension side third flow passage F leading through the second port 13, the longitudinal groove 23, the fifth port 16 and the extension side check valve 17 to the lower chamber B, and a bypass passage G leading through the third port 18, the second lateral hole 25 and the hollow portion 19 to the lower chamber B. Three flow passages are formed for fluid communication during a compression stroke. These flow passages includes a compression side first flow passage H leading through the bore 31a and the compression side damping valve 20, a compression side second flow passage J leading through the hollow portion 19, the first lateral hole 24, the first port 21 and the compression side check valve 22 to the upper chamber A, and a compression side third flow passage G leading through the hollow portion 19, the second lateral hole 25 and the third port 18 to the upper chamber A.

Figure 6:
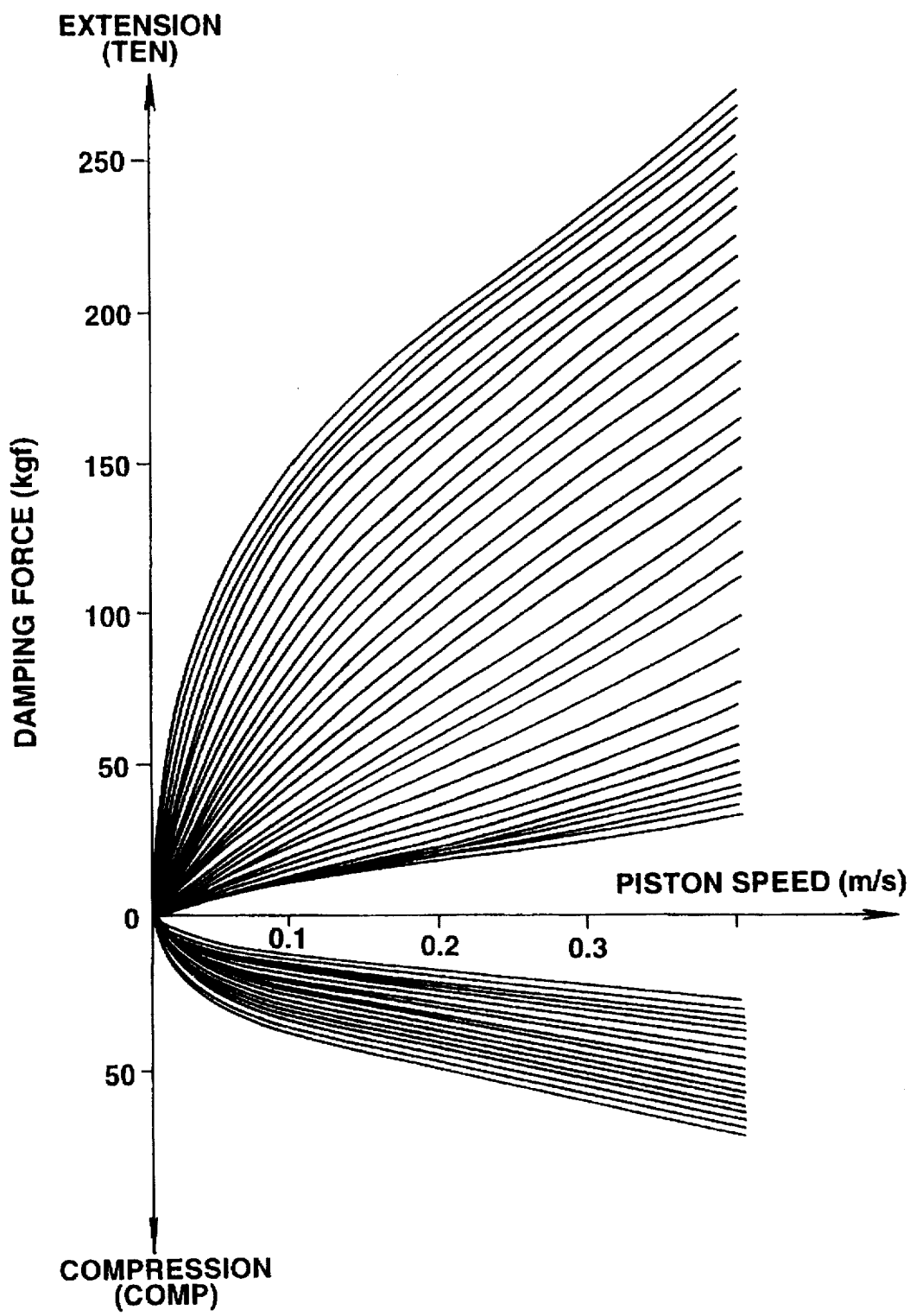
FIG. 6 is a graph showing variations in the damping force with respect to the speed of the piston of the shock absorber.
Figure 7:
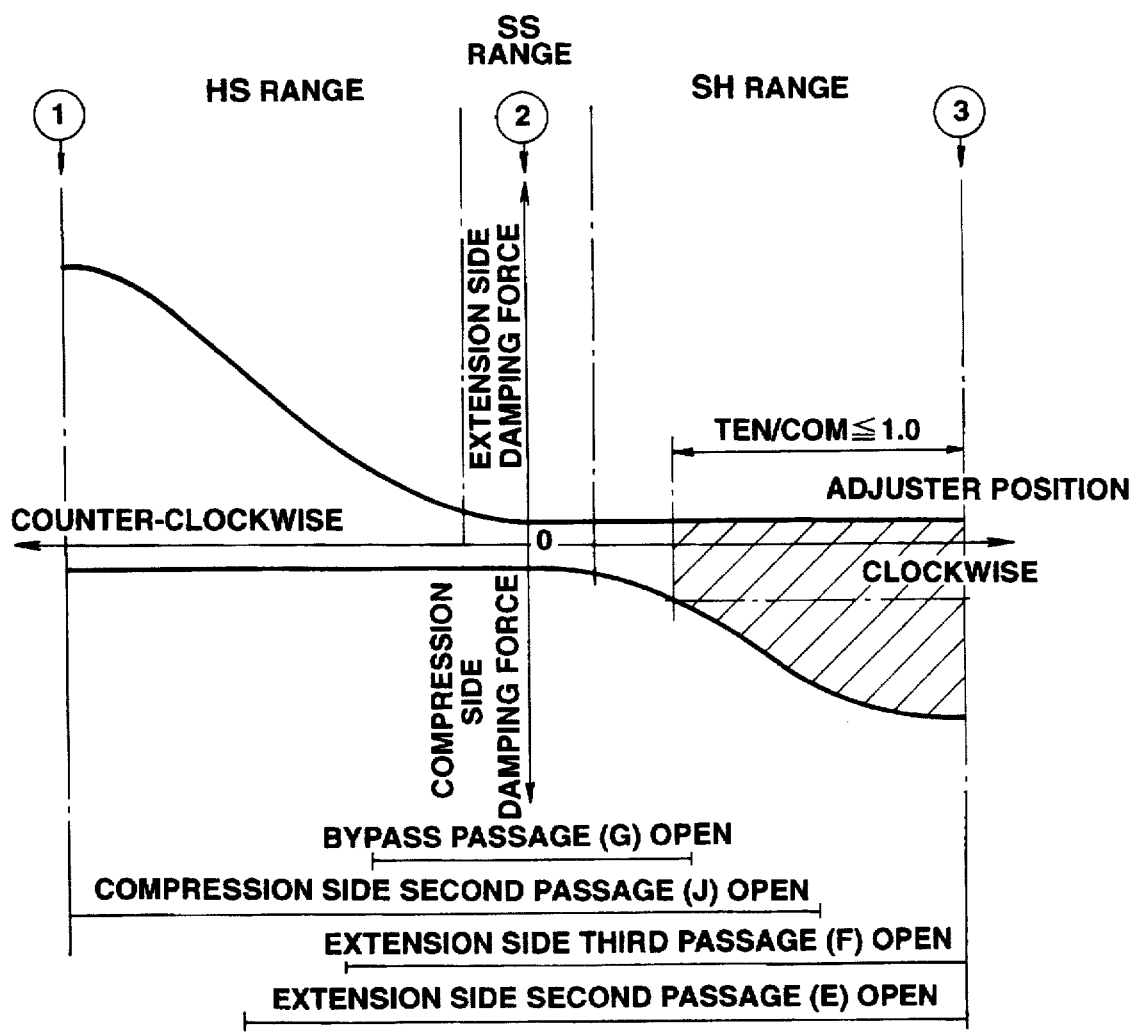
FIG. 7 is a damping force characteristic diagram corresponding to the step position of the pulse motor of the shock absorber.

That is, the shock absorber SA is arranged to provide extension and compression side damping force characteristics variable in a plurality of steps with rotation of the adjuster 40, as shown in FIG. 6. When the adjuster 40 rotates in the counter-clockwise direction from a region (referred hereinafter to as a soft region SS) where soft damping force characteristics are provided on both of the extension and compression sides, a change is made to a region (referred hereinafter to as an extension side hard region HS) where the damping force characteristic can vary in a plurality of steps on the extension side, whereas a low damping force characteristic is held on the compression side, as shown in FIG. 7. When the adjuster 40 rotates in the clockwise direction from the region SS, a change is made to a region (referred hereinafter to as a compression side hard range SH) where the damping force characteristic can vary in a plurality of steps on the compression side, whereas a low damping force characteristic is held on the extension side.

Figure 8A:
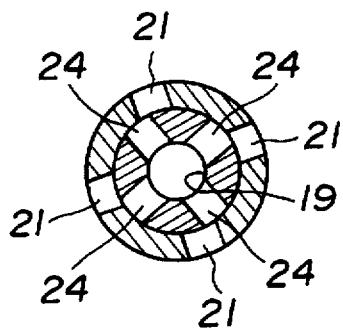
FIG. 8 includes sectional views taken along the lines K—K of FIG. 5 showing a shock absorber significant portion.
Figure 8B:
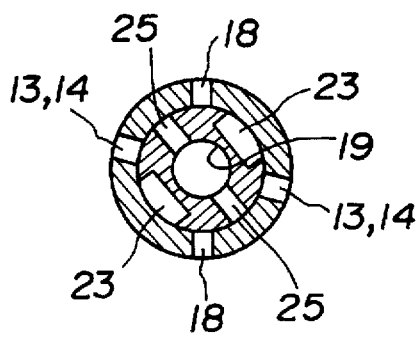
Figure 8C:
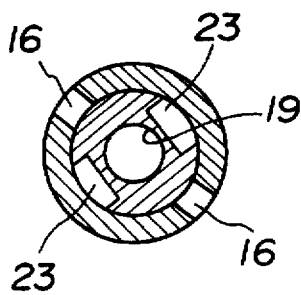
Figure 9A:
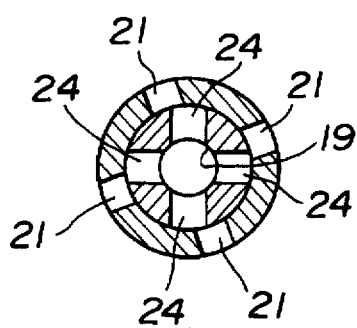
FIG. 9 includes sectional views taken along the lines L—L of FIG. 5 showing a shock absorber significant portion.
Figure 9B:
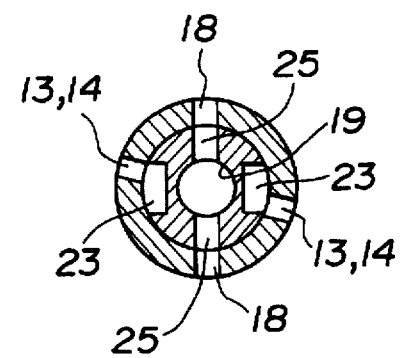
Figure 9C:
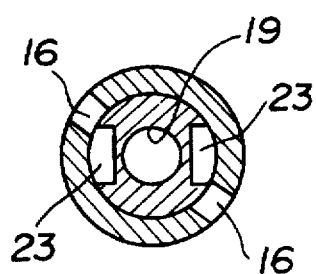
Figure 10A:
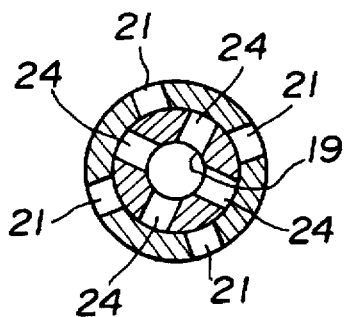
FIG. 10 includes sectional views taken along the lines N—N of FIG. 5 showing a shock absorber significant portion.
Figure 10B:
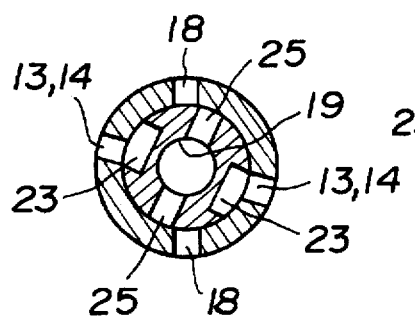
Figure 10C:
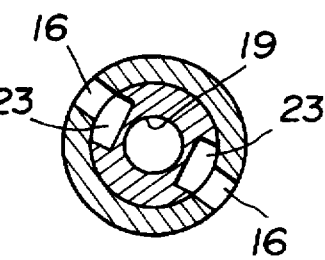
Figure 11:
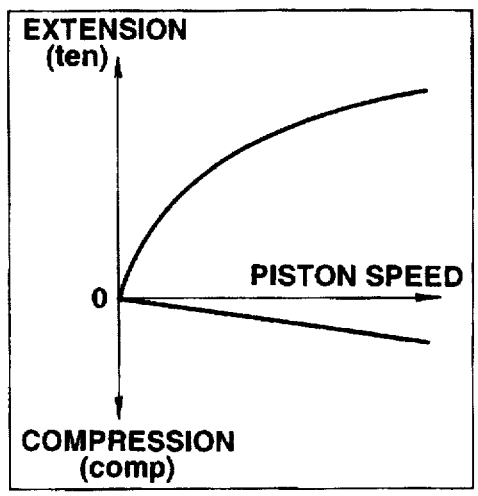
FIG. 11 is a damping force characteristic diagram provided for a hard shock absorber extension side characteristic.
Figure 12:
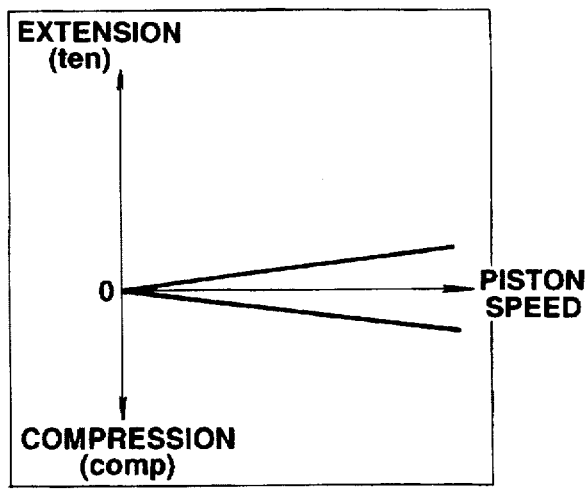
FIG. 12 is a damping force characteristic diagram provided for soft shock absorber extension and compression side characteristics.
Figure 13:
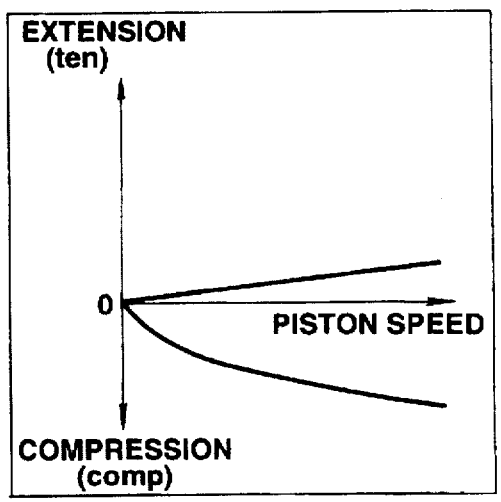
FIG. 13 is a damping force characteristic diagram provided for a hard shock absorber compression side characteristic.

FIGS. 8(a), 8(b) and 8(c) are sectional views taken along the lines K—K of FIG. 5 when the adjuster 40 is placed at respective positions ①, ② and ③ of FIG. 7. FIG. 9 contains sectional views taken along the lines L—L of FIG. 5 when the adjuster 40 is placed at respective positions ①, ② and ③ of FIG. 7. FIG. 10 contains sectional views taken along the lines N—N of FIG. 5 when the adjuster 40 is placed at respective positions ①, ② and ③ of FIG. 7. FIGS. 11, 12 and 13 shows the damping force characteristics at the respective positions.

For the shock absorber SA, the compression side hard region SH where a soft damping force characteristic is held on the extension side and the damping force characteristic can vary toward the hard side on the compression side and the region indicated by the hatched area is a range where the damping coefficient ratio TEN/COM of the extension stroke damping force (TEN) with respect to the compression stroke damping force (COM) is equal to or less than 1.0 (TEN/COM≦1.0).

The braking operation of the control unit will be described with reference to the flow diagram of FIG. 15 and the timing chart of FIG. 16.

Figure 15:
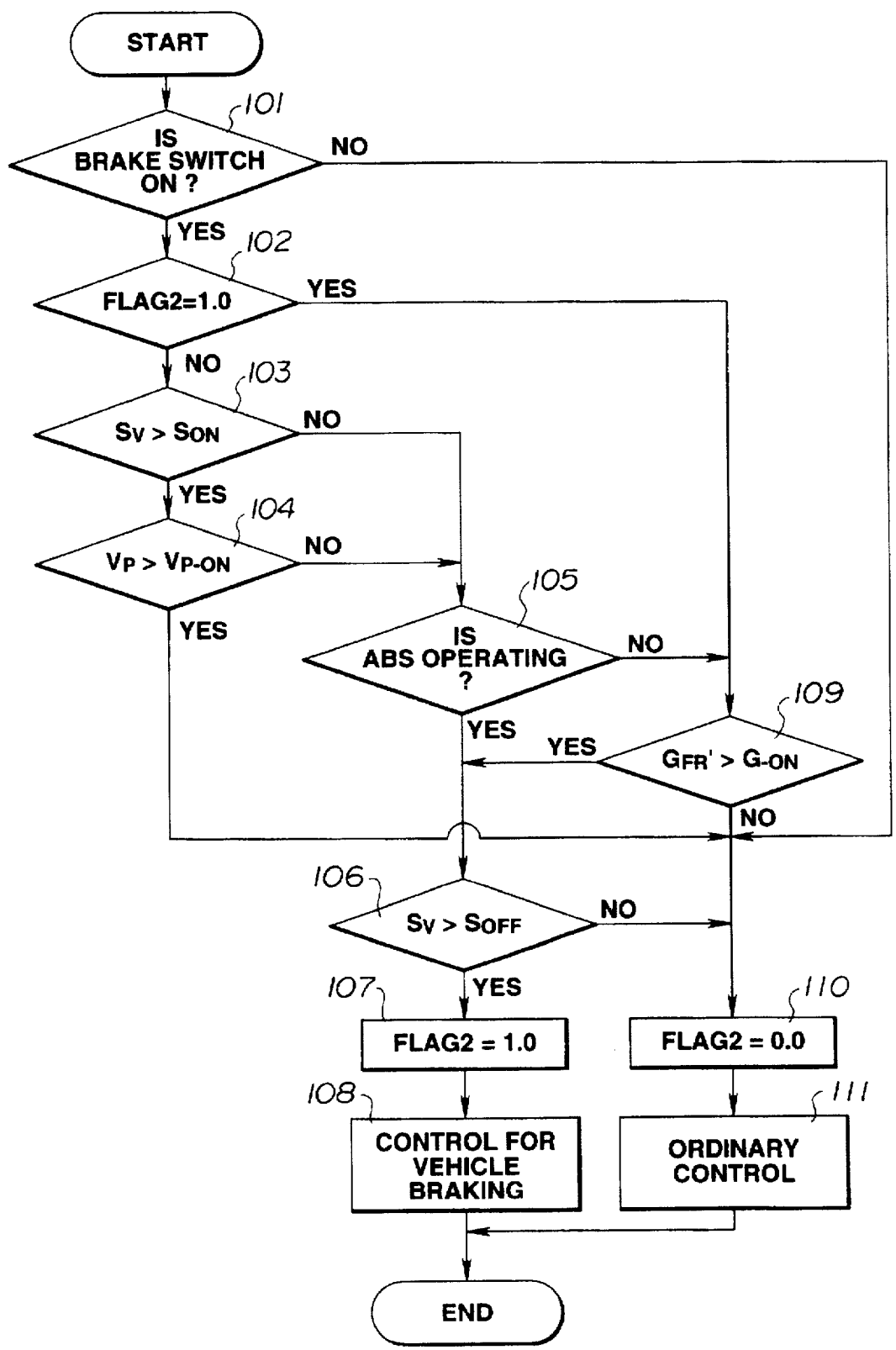
FIG. 15 is a flow diagram used in explaining the control made in the control unit used in the first embodiment of the vehicle suspension system of the invention.

In the step 101 of the flow diagram of FIG. 15, a determination is made as to whether or not the signal fed from the brake switch BS is on. If the brake pedal is depressed (YES), then the control is transferred to the step 102.

In the step 102, a determination is made as to whether or not the control flag FLAG2 to be described later is set at 1. If the answer to this question is "NO", then the control is transferred to the step 103.

In the step 103, a determination is made as to whether or not the vehicle speed Sv exceeds a predetermined vehicle speed ON threshold valve $S_{ON}$ (for example, a value ranging from 30 to 40 Km/h). If the answer to this question is "YES", then the control is transferred to the step 104.

In the step 104, a determination is made as to whether or not the pitch rate $V_P$ exceeds a predetermined posture control ON threshold value $V_{P\_ON}$. If the answer to this question is "NO", then the control is transferred to the step 105.

In the step 105, a determination is made as to whether or not the ABS operation is performed. If the answer to this question is "YES", then the control is transferred to the step 106.

In the step 106, a determination is made as to whether or not the vehicle speed Sv exceeds a predetermined vehicle speed OFF threshold value $S_{OFF}$ (0 Km/h). If the answer to this question is "YES", then the control is transferred to the step 107 where the control flag FLAG2 is set at 1. Following this, the control is transferred to the step 108.

In the step 108, a control suitable in the presence of vehicle braking is performed for the suspension system. That is, the pulse motors 3 are driven to control the damping force control positions (see FIG. 7) of the shock absorbers SA on the front and rear road wheel sides to the adjuster positions corresponding to the compression side hard region SH where a soft damping force characteristic is provided on the extension side and the damping force coefficient ratio TEN/COM of the extension stroke damping force (TEN) with respect to the compression stroke damping force (COM) is equal to or less than 1.0. Here, one control cycle is terminated.

If the question inputted in the step 101 is "NO" (the brake switch BS is off), then the control is transferred to the step 110 where the control flag FLAG2 is cleared to 0. Following this, the control is transferred to the step 111 where a control suitable in the absence of vehicle braking is performed for the suspension system. That is, in the step 111, each of the pulse motors 3 is driven toward a target damping force position P calculated as a function of the control signal V from the following equation (1):

$$P = P_{max} (v - V_{NC})/(V_H - V_{NC}) \quad (1)$$

where $P_{max}$ is a predetermined maximum damping force position, $v_H$ is the control proportional range and $V_{NC}$ is the control dead zone. The maximum damping force position $P_{max}$, the control proportional range $v_H$, and the control dead zone $V_{NC}$ are set at an extension side maximum damping force position $P_{max-T}$, an extension side control proportional range $v_{H-T}$, and an extension side control dead zone $V_{NC-T}$, respectively, when the control signal V has a positive value and at a compression side maximum damping force position $P_{max-C}$, a compression side control proportional range $v_{H-C}$, and the control dead zone $V_{NC-C}$, respectively, when the control signal has a negative value.

If the question inputted in the step 102 is "YES" (the control flag FLAG2 is set at 1, then the control is transferred to the step 109. In the step 109, a determination is made as to whether or not the braking application decision signal, that is, the vehicle deceleration $G_{FR}'$ exceeds a threshold value $G_{\_ON}$. If the answer to this question is "YES", then the control is transferred to the step 106. Otherwise, the control is transferred to the step 110.

If the answer to the question inputted in the step 103 is "NO" (the vehicle speed Sv is equal to or less than the vehicle speed ON threshold value $S_{ON}$), then the control is transferred to the step 105.

If the answer to the question inputted in the step 104 is "YES" (the pitch rate $V_P$ exceeds the posture control ON threshold value $V_{P\_ON}$), then the control is transferred to the step 110.

If the answer to the question inputted in the step 105 is "NO" (the ABS control is not performed), then the control is transferred to the step 109.

If the answer to the question inputted at the step 106 is "NO" (the vehicle speed Sv is equal to or less than the vehicle speed OFF threshold value $S_{OFF}$), then the control is transferred to the step 110.

Here, one control cycle is terminated. A similar control cycle is repeated.

The operation of the control unit 4 will be described with reference to the timing chart of FIG. 16.

(1) Control in the presence of vehicle braking

A control suitable in the presence of vehicle braking is performed when the brake switch is ON and at least one of the following conditions (i) to (iii) is fulfilled:

(i) The vehicle speed Sv exceeds the vehicle speed ON threshold valve $S_{ON}$, the pitch rate $V_P$ is equal to or less than the posture control ON threshold valve $V_{P\_ON}$, and the ABS operation is performed or the deceleration $G_{FR}'$ exceeds the threshold value $G_{\_ON}$ even when the control flag FLAG2 is cleared to 0. That is, the vehicle speed is fast, the vehicle pitch is small and rapid braking is applied to the vehicle.

(ii) The vehicle speed Sv remains greater than the vehicle speed OFF threshold value $S_{OFF}$ and the ABS operation is performed or the deceleration $G_{FR}'$ exceeds the threshold value $G_{-ON}$ even when the control flag LFAG2 is cleared to 0 and the vehicle speed Sv is equal to or less than the vehicle speed ON threshold value $S_{ON}$. That is, rapid braking is applied to the vehicle even when the vehicle speed is slow.

(iii) The control flag FLAG2 is set at 1 and the deceleration $G_{FR}{}'$ exceeds the threshold value $G_{-ON}$. That is, in the presence of rapid braking to decrease the vehicle speed in a predetermined fashion.

During the control performed in the presence to vehicle braking, the damping force characteristics of the shock absorbers SA provided on the front and rear road wheel sides are controlled to the compression side hard range SH where a soft damping characteristic is provided on the extension side and to an adjuster position (indicated by the hatched area of FIG. 7) where the damping coefficient ratio TEN/COM of the extension stroke damping force (TEN) with respect to the compression stroke damping force (COM) is equal to or less than 1.0. This is effective to suppress the contact load variations (reductions) resulting from the vehicle behavior when the vehicle is running on a bad road causing a high-frequency road surface input so as to ensure sufficient braking force.

Figure 18:
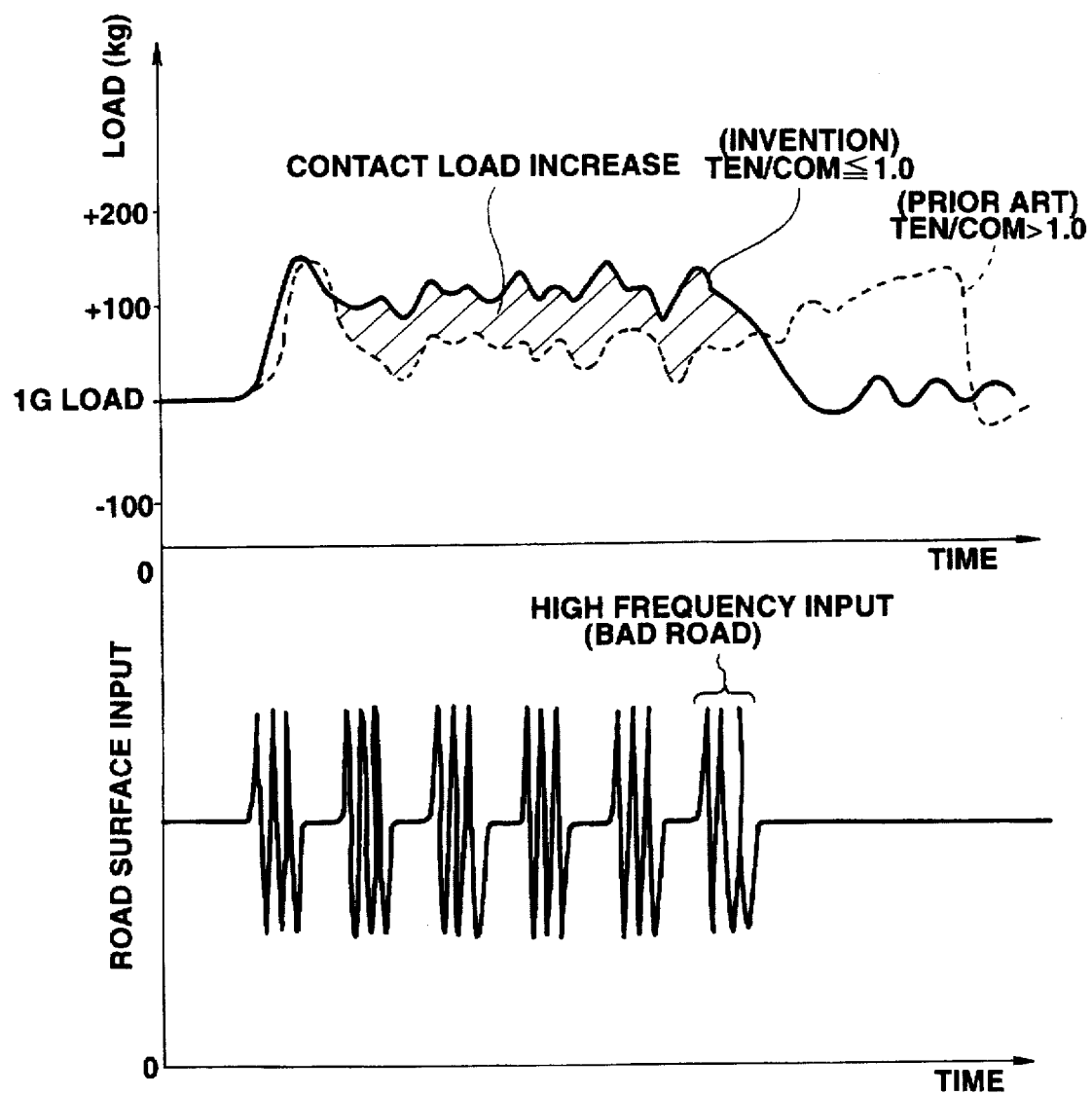
FIG. 18 contains graphs showing contact load variations measured when the damping coefficient ratio TEN/COM of the damping force (TEN) provided during the extension stroke to the damping force (COM) provided during the compression stroke is greater than 1.0 (prior art) and when the damping coefficient ratio is equal to or less than 1.0 (invention).

That is, FIG. 18 shows contact load variations. The dotted curve relates to the conventional system where the contact load variations measured when the ratio TEN/COM (damping coefficient ratio) of the damping force (TEN) provided during its extension stroke with respect to the damping force (COM) provided during its compression stroke is greater than 1.0. The solid curve relates to the system of the invention where the contact load variations measured when the damping coefficient ratio is equal to or less than 1.0. As can be seen from FIG. 18, the contact load is smaller in the former case than in the latter case when the vehicle is running on a bad road causing a high frequency road surface input.

Figure 19:
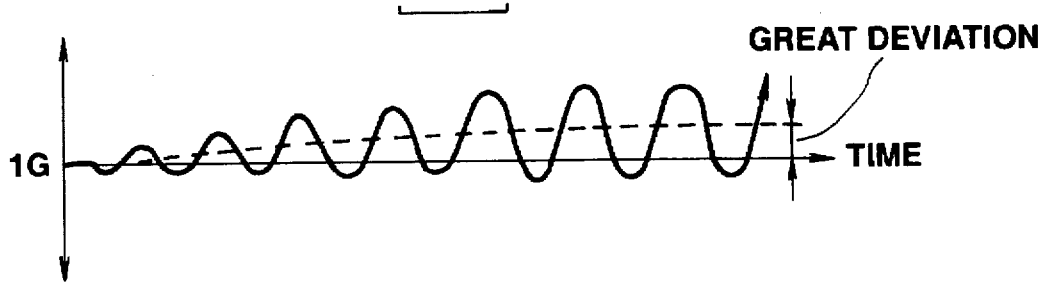
FIG. 19 contains graphs (a), (b) and (c) showing contact load variations with respect to the load amplitude center for different damping coefficient ratios (TEN/COM) of 4.0, 1.5 and 0.8.
Figure 19:
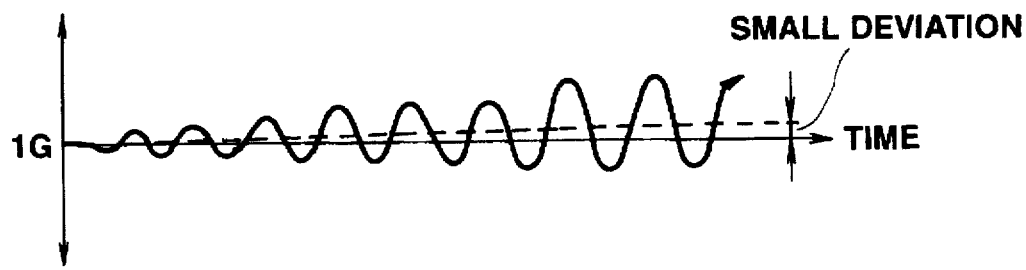
Figure 19:
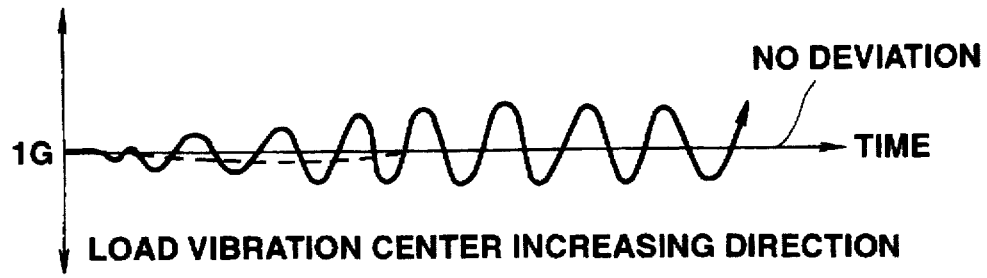

FIGS. 19(a), 19(b) and 19(c) shows contact loads variations with respect to respective load variation centers at damping coefficient ratios (TEN/COM) of 4.0, 1.5 and 0.8. It can be seen from these figures that the deviation of the load variation center in the load decreasing direction increases when the damping coefficient ratio is equal to or greater than 1.0. According to the invention where the damping coefficient ratio (for example, 0.8) is equal to or less than 1.0 there is almost no deviation of the load variation center in the load decreasing direction.

(II) Ordinary control

When the brake switch is OFF, the ordinary control is performed. The ordinary control is performed when the conditions (i) to (iii) described hereinbefore are not fulfilled even though the brake switch is ON.

During the ordinary control, each of the pulse motors 3 is driven toward the target damping force position P calculated from Equation (1).

The ordinary control will be described with reference to the timing chart of FIG. 17. As shown in the timing chart of FIG. 17, each of the pulse motors 3 is driven toward the extension side target damping force position P so as to control the corresponding shock absorber SA toward the extension side hard range HS when the control signal V exceeds the extension side control dead zone $V_{NC-T}$.

When the control signal v is between the extension side control dead zone $V_{NC-T}$ and the compression side control dead zone $V_{NC-C}$, each of the pulse motors 3 is controlled to control the corresponding shock absorber SA to the soft range SS.

When the control signal is less than the compression side control dead zone $V_{NC-C}$, each of the pulse motors 3 is driven toward the compression side target damping force position P so as to control the corresponding shock absorber SA to the compression side hard range SH.

Figure 17:
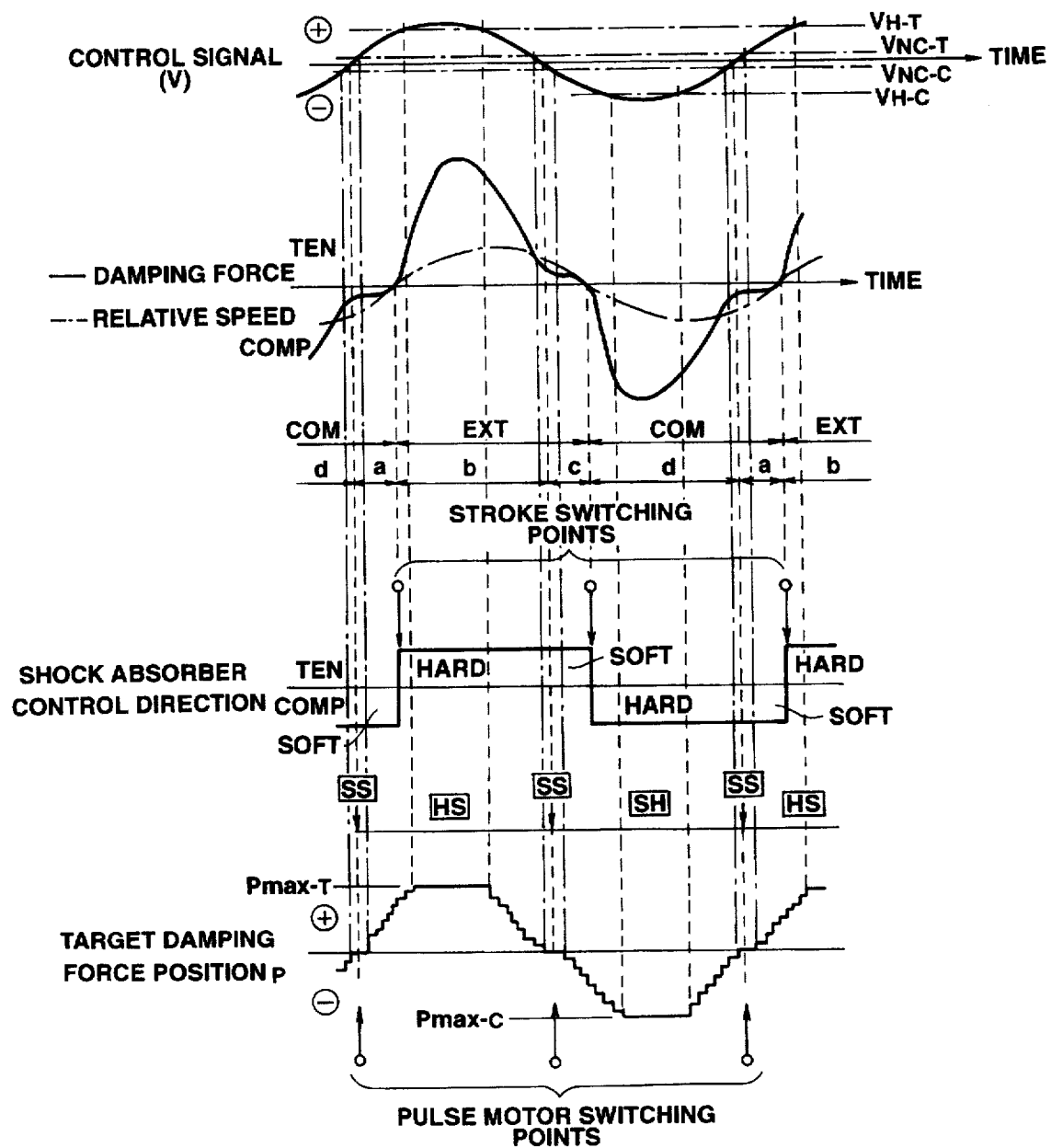
FIG. 17 is a timing chart used in explaining the ordinary control made in the control unit used in the first embodiment of the vehicle suspension system of the invention.

In the timing chart of FIG. 17, the character (a) indicates a range where the control signal V changes from a negative value (downward) to a positive value (upward) and the relative speed remains negative (the shock absorber SA is in the compression stroke). In this range (a), the shock absorber SA is controlled to the extension side hard range HS based on the direction of the control signal V so as to provide a soft characteristic on the compression side which corresponds to the stroke of the shock absorber SA.

The character (b) indicates a range where the control signal V remains positive (upward) and the relative speed changes from a negative value to a positive value (the shock absorber SA is in the extension stroke). In this range (b), the shock absorber SA is controlled to the extension side hard range HS based on the direction of the control signal V so as to provide a hard characteristic in proportional to the value of the control signal V on the extension side which corresponds to the stroke of the shock absorber SA.

The character (c) indicates a range where the control signal V changes from a positive value (upward) to a negative value (downward) and the relative speed remains positive (the shock absorber SA is in the extension stroke). In this range (c), the shock absorber SA is controlled to the compression side hard range SH based on the direction of the control signal V so as to provide a soft characteristic on the extension side which corresponds to the stroke of the shock absorber SA.

The character (d) indicates a range where the control signal V remains negative (downward) and the relative speed changes from a positive value to a negative value (the shock absorber SA is in the extension stroke). In this range (d), the shock absorber SA is controlled to the compression side hard range SH based on the direction of the control signal V so as to provide a hard characteristic in proportional to the value of the control signal V on the compression side which corresponds to the stroke of the shock absorber SA.

As described above, the damping force characteristic control of this embodiment is the same as the control utilizing the sky hook theory where a hard characteristic is provided on the side of the stroke of the shock absorber SA when the control signal v calculated based on the sprung mass vertical speed and the relative speed between the sprung mass and the unsprung mass have the same sign (ranges b, d), and a soft characteristic is provided on the side of the stroke of the shock absorber SA when the control signal V and the relative speed have opposite signs (ranges a, c). Furthermore, in this embodiment, the deceleration force characteristic is switched without the operation of the pulse motor 3 upon a change from the range (a) to the range (b) and upon a change from the range (c) to the range (d).

As described above, this embodiment of the vehicle suspension system of the invention has advantages listed as follows:

① Since the damping force characteristic is controlled to the compression side hard range SH where the damping coefficient ratio of the extension side damping force with respect to the compression side damping force is equal to or less than 1.0 (that is, the extension side damping force is less than the compression side damping force) in the presence of vehicle braking, it is possible to prevent contact load reductions resulting from vehicle behaviors so as to ensure sufficient braking force.

② Since the damping force characteristic control is switched from the control suitable in the presence of vehicle braking to the ordinary control when the vehicle pitch rate exceeds a predetermined threshold valve even upon the application of braking to the vehicle, it is possible to suppress the vehicle pitching motions in the presence of vehicle braking.

(3) Since the damping force characteristic is switched at a smaller frequency as compared to the damping force characteristic control utilizing the conventional sky hook theory, it is possible to increase the control response speed and also to improve the durability of the pulse motors 3.

Description will be made to a second embodiment of the vehicle suspension system of the invention.

The second embodiment is substantially the same as the first embodiment except for the mode of the control performed in the control unit 4. Thus like reference numerals have been applied with respect to the equivalent components and a detailed description therefor will not be repeated here.

The braking operation of the control unit used in the second embodiment will be described with reference to the flow diagram of FIG. 20 and the timing chart of FIG. 21.

In the step 201 of the flow diagram of FIG. 15, a determination is made as to whether or not the signal fed from the brake switch BS is on. If the answer to this question is "YES", then the control is transferred to the step 202.

In the step 202, a determination is made as to whether or not the vehicle speed Sv exceeds a predetermined vehicle speed ON threshold valve $S_{ON}$ (for example, a value ranging from 30 to 40 Km/h). If the answer to this question is "YES", then the control is transferred to the step 203.

In the step 203, a determination is made as to whether or not the ABS operation is performed. If the answer to this question is "YES", then the control is transferred to the step 204.

In the step 204, a determination is made as to whether or not the vehicle speed Sv exceeds a predetermined vehicle speed OFF threshold value $S_{OFF}$ (0 Km/h). If the answer to this question is "YES", then the control is transferred to the step 205.

Figure 22:
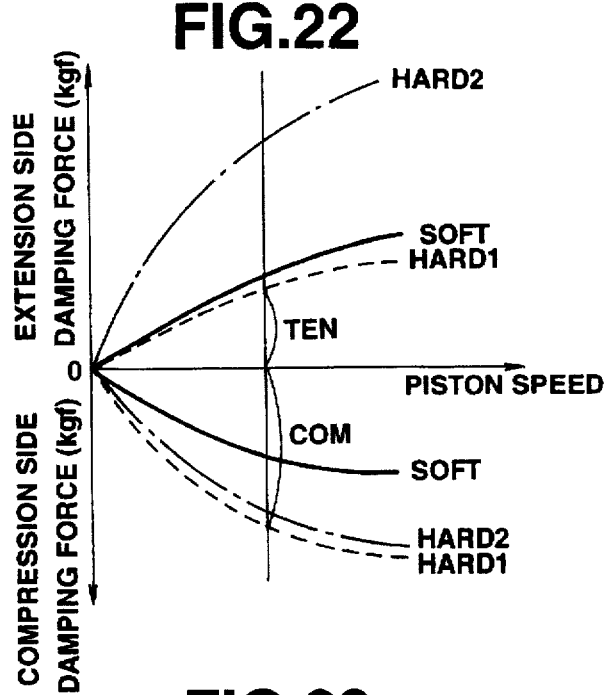
FIG. 22 is a damping force characteristic diagram showing variations in the damping force with respect to the speed of the piston of the shock absorber used in the second embodiment of the vehicle suspension system of the invention.

In the step 205, a control suitable in the presence of vehicle braking is performed for the suspension system. That is, the pulse motors 3 are driven to control the damping force control positions of the shock absorbers SA on the front and rear road wheel sides to the adjuster positions corresponding to a HARD1 where the damping force coefficient ratio TEN/COM of the extension stroke damping force (TEN) with respect to the compression stroke damping force (COM) is equal to or less than 1.0, as indicated by the dotted curve of the damping force characteristic diagram of FIG. 22. Here, one control cycle is terminated.

If the question inputted in the step 201 is "NO" (the brake switch BS is off), then the control is transferred to the step 207, where an ordinary control suitable in the absence of vehicle braking is performed for the suspension system. Here, one control cycle is terminated.

If the answer to the question inputted in the step 202 or 203 is "NO" (when the vehicle speed Sv is equal to or less than the vehicle speed ON threshold value $S_{ON}$ or when the ABS control is not performed), then the control is transferred to the step 206. In the step 206, a determination is made as to whether or not the braking application decision signal, that is, the vehicle deceleration $G_{FR}'$ exceeds a threshold value $G_{ON}$. If the answer to this question is "YES", then the control is transferred to the step 204. Otherwise, the control is transferred to the step 207.

If the answer to the question inputted in the step 204 is "NO" (the vehicle speed Sv is equal to or less than the vehicle speed OFF threshold value $S_{OFF}$), then the control is transferred to the step 207.

Here, one control cycle is terminated. Thereafter, a similar control cycle is repeated.

The operation of the control unit 4 will be described with reference to the timing chart of FIG. 16.

(1) Control in the presence of vehicle braking

A control suitable in the presence of vehicle braking is performed when the brake switch is ON and at least one of the following conditions (iv) and (v) is fulfilled:

(iv) The vehicle speed Sv exceeds the vehicle speed ON threshold valve $S_{ON}$, and the ABS operation is performed or the deceleration $G_{FR}'$ exceeds the threshold value $G_{ON}$. That is, the vehicle speed is fast, and rapid braking is applied to the vehicle.

(v) The vehicle speed Sv remains greater than the vehicle speed OFF threshold value $S_{OFF}$ and the deceleration $G_{FR}'$ exceeds the threshold value $G_{ON}$ even when the vehicle speed Sv is equal to or less than the vehicle speed ON threshold value $S_{ON}$. That is, rapid braking is applied to the vehicle even when the vehicle speed is slow.

(II) Ordinary control

When the brake switch is OFF, the ordinary control is performed. The ordinary control is performed when the conditions (iv) and (v) described hereinbefore are not fulfilled even though the brake switch is ON.

With the second embodiment, thus, the vehicle pitching motions cannot be suppressed in the presence of vehicle braking. However, it is possible to prevent contact load reductions resulting from vehicle behaviors so as to ensure sufficient braking force and also simplify the control as compared to the first embodiment so as to reduce the cost.

Although the invention has been described in connection with specified embodiments, it is to be understood that the invention is not limited in any way to the illustrated embodiments and it is evident that many alternatives, modifications and variations will be apparent to those skilled in the art. Accordingly, it is intended to embrace all alternatives, modifications and variations that fall within the scope of the appended claims.

Figure 20:
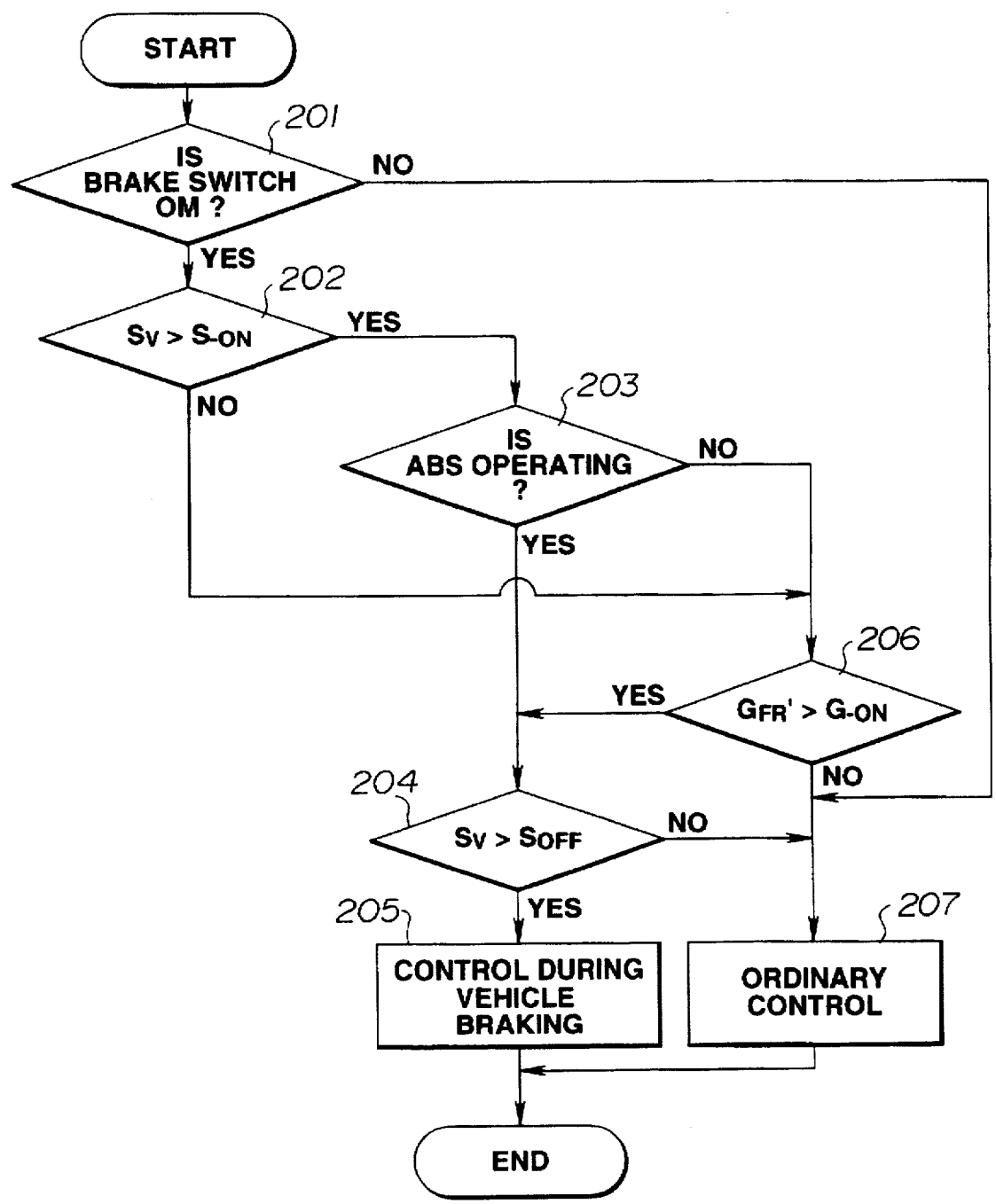
FIG. 20 is a flow diagram used in explaining the control made in the control unit used in a second embodiment of the vehicle suspension system of the invention.
Figure 21:
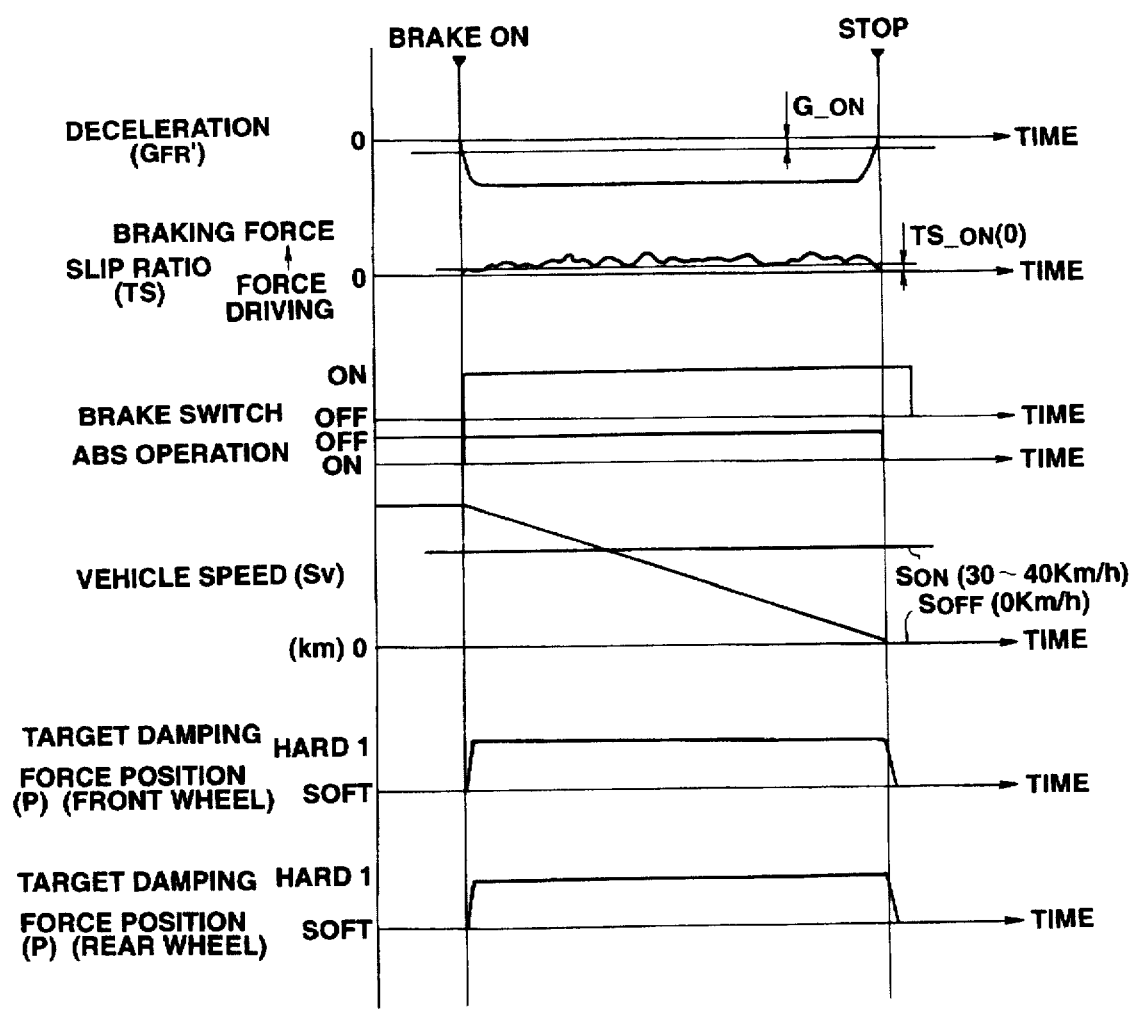
FIG. 21 is a timing chart used in explaining the control of the second embodiment of the vehicle suspension system of the invention.

For example, in the step 109 of the flow diagram of FIG. 15 and the step 206 of the flow diagram of FIG. 20, a determination is made as to whether or not the braking application decision signal, that is, the vehicle deceleration $G_{FR}'$ exceeds a threshold value $G_{ON}$. The vehicle deceleration $G_{FR}'$ may be replaced with a tire slip ratio TS.

Figure 24:
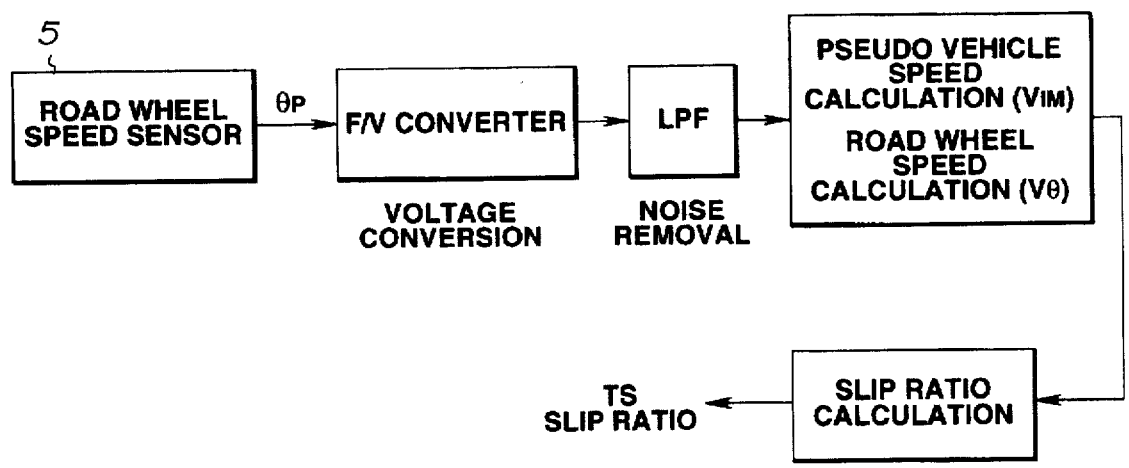
FIG. 24 is a block diagram showing a signal processing circuit used in calculating a tire slip ratio.

FIG. 24 is a block diagram showing a signal processing circuit used in calculating the tire slip ratio TS. As shown in FIG. 24, the road wheel speed pulse signal $\theta_P$ is fed from the road wheel speed sensor 5 to an F/V converter which converts it into a corresponding voltage signal. The converted signal is fed to a low pass filter LPF which removes noise from the converted signal. This signal is used to calculate the road wheel speed V $\theta$ and the pseudo vehicle speed $V_{IM}$. The tire slip ratio TS is calculated from the following equation (2):

$$TS=(V_{IM}-V\theta)/V_{IM} \qquad (2)$$

Figure 16:
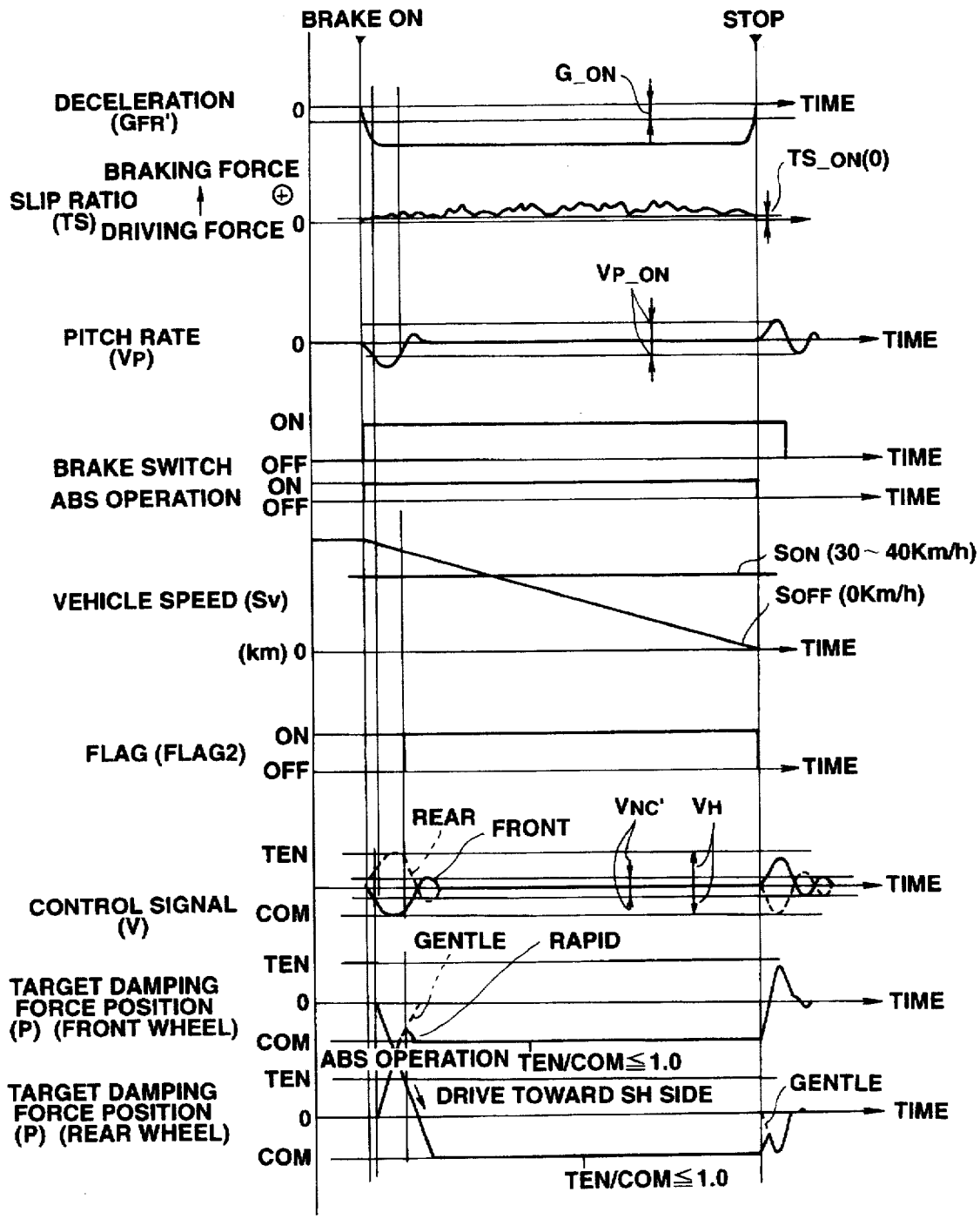
FIG. 16 is a timing chart used in explaining the control made in the control unit used in the first embodiment of the vehicle suspension system of the invention.

It may be considered that a braking force is produced when the tire slip ratio has a positive value and a driving force is produced when the tire slip ratio is 0, as shown in FIG. 16.

It is, therefore, possible to judge the application of braking to the vehicle by a determination as to whether or not the tire slip ratio TS exceeds a predetermined slip ratio threshold value $TS_{ON}$ (set substantially at 0) in the step 109.

The slip ratio value calculated for the antiskid control may be used as the tire slip ratio TS.

Figure 23:
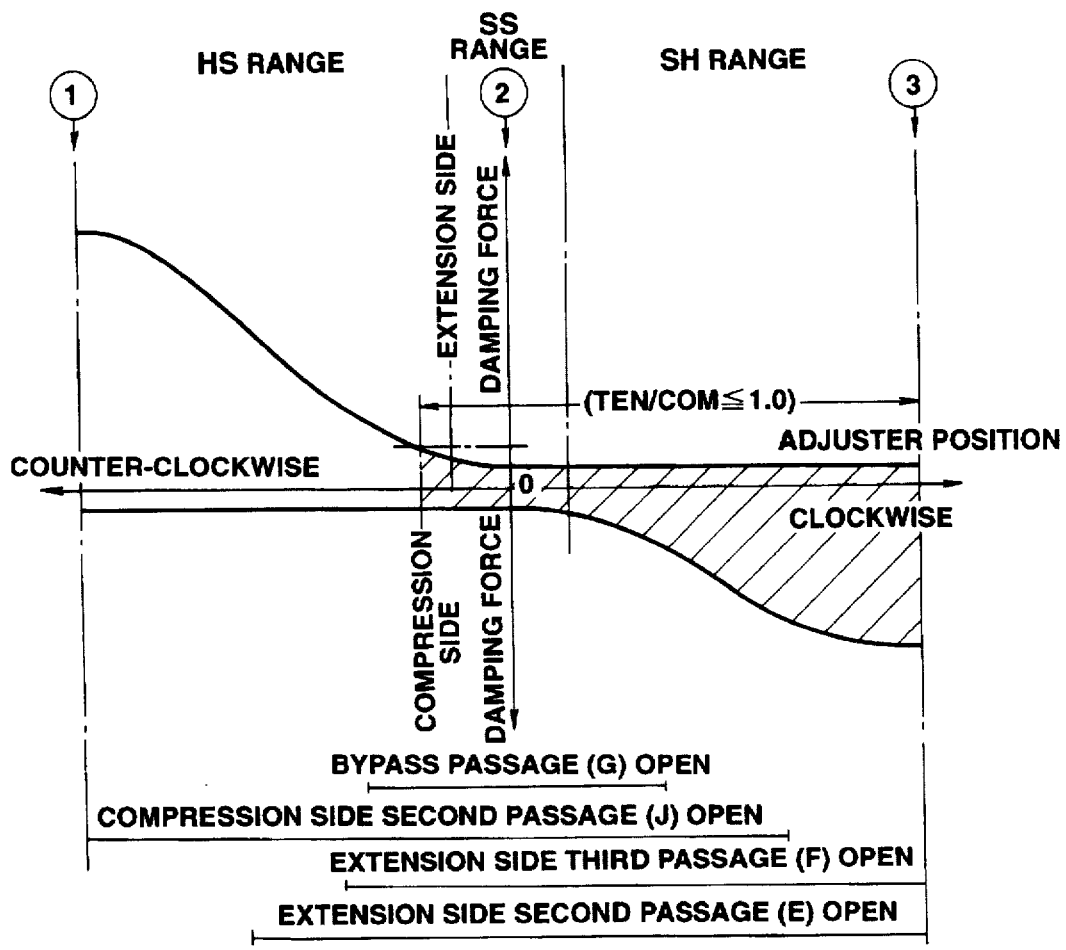
FIG. 23 is a damping force characteristic diagram showing variations in the damping force with respect to the step position of the pulse motor of the shock absorber used in another embodiment of the vehicle suspension system of the invention.

Although the invention has been described in connection with the case where the adjuster position where the damping coefficient ratio TEN/COM of the extension stroke damping force (TEN) with respect to the compression stroke damping force (COM) is equal to or less than 1.0 is set in the compression side hard range SH, it is to be understood that it may be set in a wider range extending from the compression side hard range SH to the extension side hard range HS, as shown in FIG. 23.

USEFULNESS IN THE FIELD

The vehicle suspension system of the invention is useful as a suspension system for suspending the front or rear road wheels of a passenger car.

I claim:

1. A vehicle suspension system provided between a vehicle body and each of road wheels, the vehicle suspension system including damping force varying means for switching extension and compression side damping force characteristics in a plurality of steps, the damping force varying means being operable to provide a 0.1 or more damping coefficient ratio of the extension side damping force with respect to the compression side damping force, the vehicle suspension system comprising:

a shock absorber for damping vibrations transmitted from the road wheels by movement of a fluid enclosed therein;

vehicle behavior detecting means for detecting a vehicle behavior;

damping force characteristic control means having ordinal control means for controlling the damping force characteristic of the shock absorber based on a vehicle behavior indicative signal produced from vehicle behavior detecting means;

braking application detecting means for detecting the application of braking to the vehicle; and correcting means provided in the damping force characteristic control means for switching the damping force characteristic varying means of the shock absorber to provide a 1.0 or less damping coefficient ratio of the extension side damping force with respect to the compression side damping force when the braking application detecting means detects the application of braking to the vehicle.

2. The vehicle suspension system as claimed in claim 1, further comprising:

pitch rate detecting means for detecting a vehicle pitch rate; and means for stopping the function of the correcting means when the pitch rate detected by the pitch rate detecting means exceeds a predetermined threshold value.

3. The vehicle suspension system as claimed in claim 1, wherein the damping force varying means initially sets the damping coefficient ratio to a value greater than 1.0.

4. A vehicle suspension system provided between a vehicle body and each of road wheels, the vehicle suspension system including a damping force varying unit configured to switch extension and compression side damping force characteristics in a plurality of steps, the damping force varying unit being operable to provide a 0.1 or more damping coefficient ratio of the extension side damping force with respect to the compression side damping force, the vehicle suspension system comprising:

a plurality of shock absorbers configured to damp vibrations transmitted from a corresponding one of the road wheels by movement of a fluid enclosed with each of the shock absorbers;

a vehicle behavior detecting unit configured to detect a vehicle behavior and to output a vehicle behavior signal indicative thereof;

a damping force characteristic control unit connected to receive the vehicle behavior signal from the vehicle behavior detecting unit, the damping force characteristic control unit configured to control the damping force characteristic of the shock absorbers based on the vehicle behavior signal;

a braking application detecting unit configured to detect application of braking to the vehicle and to output a brake detecting signal indicative thereof; and a correcting unit provided in the damping force characteristic control unit and configured to receive the brake detecting signal from the braking application detecting unit, the correcting unit configured to switch the damping force characteristic of the shock absorbers to provide a 1.0 or less damping coefficient ratio of the extension side damping force with respect to the compression side damping force upon receipt of the brake detecting signal.

5. The vehicle suspension system as claimed in claim 4, further comprising:

a pitch rate detecting unit configured to detect a vehicle pitch rate; and a stopping unit configured to stop the function of the correcting unit when the pitch rate detected by the pitch rate detecting unit exceeds a predetermined threshold value.

6. The vehicle suspension system as claimed in claim 4, wherein the damping force varying unit initially sets the damping coefficient ratio to a value greater than 1.0.

7. A method of providing control of a vehicle suspension system for a vehicle, the method comprising the steps of:

a) setting a damping coefficient ratio of at least one shock absorber based on the vehicle behavior, the damping coefficient ratio being a ratio of an extension side damping force with respect to a compression side damping force of the shock absorber, the damping coefficient ratio capable of being set within a range from a first value less than 1.0 and a second value greater than 1.0, the damping coefficient ratio being initially set to a value greater than 1.0;

b) detecting a braking of the vehicle;

c) detecting whether a speed of the vehicle exceeds a preset speed value; and d) resetting the damping coefficient ratio to a value less than 1.0 when both the braking of the vehicle is detected and the speed of the vehicle is greater than the preset speed value.

8. The method as claimed in claim 7, further comprising the step of controlling the damping coefficient ratio to have a value greater than 1.0 but less than or equal to the second value when either the braking of the vehicle has no longer been detected, or when the speed of the vehicle no longer exceeds the preset speed value.

* * * * *